United States Patent
Iwamoto et al.

(10) Patent No.: US 6,926,640 B2
(45) Date of Patent: Aug. 9, 2005

(54) TRANSMISSION CONTROL SYSTEM OF AUTOMATIC TRANSMISSION FOR VEHICLE

(75) Inventors: Ikuhiro Iwamoto, Aichi (JP); Masahiro Hamano, Aichi (JP); Katsutoshi Usuki, Aichi (JP); Yoichi Furuichi, Aichi (JP); Nobuhiro Yamanaka, Aichi (JP)

(73) Assignee: JATCO LTD, Fuji (JP)

( * ) Notice: Subject to any disclaimer, the term of this patent is extended or adjusted under 35 U.S.C. 154(b) by 8 days.

(21) Appl. No.: 10/677,859

(22) Filed: Oct. 3, 2003

(65) Prior Publication Data
US 2004/0116252 A1 Jun. 17, 2004

(30) Foreign Application Priority Data

Oct. 4, 2002 (JP) ........................................ 2002-292769
Sep. 9, 2003 (JP) ........................................ 2003-317054

(51) Int. Cl.$^7$ .......................... B60K 41/02; G06F 17/00; G06F 19/00; G06F 7/00
(52) U.S. Cl. .......................... 477/175; 477/70; 477/180; 477/181; 701/54; 701/62; 701/67
(58) Field of Search ........................... 477/70, 110, 120, 477/121, 175, 180–181, 904; 701/54, 62, 66, 67

(56) References Cited

U.S. PATENT DOCUMENTS 4,922,424 A * 5/1990 Hiramatsu .................... 701/53
5,445,579 A 8/1995 Fujita et al.
5,888,170 A * 3/1999 Takiguchi et al. ........... 477/146
6,712,735 B2 * 3/2004 Hayabuchi et al. ........... 477/68
2004/0053744 A1 * 3/2004 Sugimura .................... 477/101

FOREIGN PATENT DOCUMENTS

EP          1 188 963 A2    3/2002
JP          3097339 B2      8/2000

* cited by examiner

Primary Examiner—Tisha Lewis
(74) Attorney, Agent, or Firm—Foley & Lardner LLP (57) ABSTRACT

A transmission control system, includes:

1) a high speed side friction element for establishing a high speed side change gear; and

2) a low speed side friction element for establishing a low speed side change gear.

After a disengagement of the high speed side friction element, the low speed side friction element makes an engagement for carrying out a downshift from the high speed side change gear to the low speed side change gear.

When the downshift is carried out with an accelerator turned off,
  a stepping on the accelerator sensed in a period between the following times:
  i) a time for commanding a start of a transmission, and
  ii) a time for the low speed side friction element to start a conveyance of a torque,
  prevents a changeover to the low speed side change gear, thus keeping the high speed side change gear.

14 Claims, 6 Drawing Sheets

Fig. 8
ACCELERATOR OFF CONTROL

TRANSMISSION CONTROL SYSTEM OF AUTOMATIC TRANSMISSION FOR VEHICLE

BACKGROUND OF THE INVENTION

1. Field of the Invention

The present invention relates to a transmission control system of an automatic transmission for a vehicle, which transmission control system carries out a downshift by changing engagement state of two friction elements.

2. Description of the Related Art

Conventionally, an automatic transmission combining a torque converter and a planet gear is widely used for a vehicle. The above automatic transmission makes the following control:

For carrying out a downshift (e.g., from 3rd speed to 2nd speed) in a coasting travel with an accelerator of the vehicle turned off (full closed), a 3rd speed friction element (namely, a disengagement side clutch which so far was engaged) is so controlled as to be disengaged, while a 2nd speed friction element (namely, an engagement side clutch) is so fedback gradually from a disengagement state to an engagement state. With this, the downshift to the 2nd speed is ended.

Hereinabove, a driver of the vehicle stepping on the accelerator again in the feedback after an actual transmission start time (namely, after the engagement side clutch starts the engagement, or after torque conveyance is started) may cause a feedback for increasing an oil pressure of the disengagement side clutch so as to restrain a rapid increase in speed of an input shaft of the transmission (namely, a turbine speed).

In this case, however, a possible response delay in increasing the actual oil pressure relative to a duty ratio change of a solenoid may cause a rapid engine speed increase. This may make a determination that the oil pressure is short, thus a controller may increase the oil pressure more than necessary, resulting in a great transmission shock with both the disengagement side clutch engaged and the engagement side clutch engaged.

U.S. Pat. No. 5,445,579 (equivalent of Japanese Patent No. 3097339B2) discloses a control (referred to as "speed change control apparatus and method" in the above patent) solving the above inconvenience. More specifically, U.S. Pat. No. 5,445,579 (equivalent of Japanese Patent No. 3097339B2) discloses the control for preventing the above both-side engagements (disengagement side clutch and the engagement side clutch) by preventing an excessive oil pressure supply by setting up an upper limit of the oil pressure supplied to the disengagement side clutch. With the prevention of the above double engagements, the transmission shock can be restricted.

The control according to the U.S. Pat. No. 5,445,579 (equivalent of Japanese Patent No. 3097339B2) is, however, directed to the accelerator stepped on in the feedback after the actual transmission start time. In other words, the control according to the U.S. Pat. No. 5,445,579 (equivalent of Japanese Patent No. 3097339B2) is not effective for the accelerator stepped on before the actual transmission start time.

More specifically about this: Stepping on the accelerator before the actual transmission start time (a period from a time for commanding a transmission start to a time for starting torque conveyance by the engagement side clutch, during which period torque capacity of the disengagement side clutch is continuously decreased) may cause a slip to the disengagement side clutch, thus causing the rapid engine speed increase. Thereafter, the oil pressure may follow, thus rapidly engaging the engagement side clutch, resulting in the transmission shock.

Moreover about this: With the accelerator stepped on in the feedback after the actual transmission start time, the control according to the U.S. Pat. No. 5,445,579 (equivalent of Japanese Patent No. 3097339B2) restricts the transmission shock by merely setting up the upper limit of the oil pressure supplied to the disengagement side clutch. In this case, the rapid engine speed increase cannot be prevented assuredly. The driver therefore cannot obtain a preferred acceleration feeling.

BRIEF SUMMARY OF THE INVENTION

It is an object of the present invention to provide a transmission control system of an automatic transmission for a vehicle, which transmission control system can make the following operation in a coasting travel with an accelerator turned off:

To prevent a rapid engine speed increase when the accelerator is stepped on before and after an actual transmission start time, to thereby assuredly restrict a transmission shock.

According to a first aspect of the present invention, there is provided a transmission control system, comprising:

1) a high speed side friction element for establishing a high speed side change gear; and 2) a low speed side friction element for establishing a low speed side change gear.

After a disengagement of the high speed side friction element, the low speed side friction element makes an engagement for carrying out a downshift from the high speed side change gear to the low speed side change gear.

When the downshift is carried out with an accelerator turned off, a stepping on the accelerator sensed in a period between the following times:

i) a time for commanding a start of a transmission, and ii) a time for the low speed side friction element to start a conveyance of a torque, prevents a changeover to the low speed side change gear, thus keeping the high speed side change gear.

According to a second aspect of the present invention, there is provide a transmission control system, comprising:

1) a high speed side friction element for establishing a high speed side change gear; and 2) a low speed side friction element for establishing a low speed side change gear.

After a disengagement of the high speed side friction element, the low speed side friction element makes an engagement for carrying out a downshift from the high speed side change gear to the low speed side change gear.

When the downshift is carried out with an accelerator turned off, a stepping on the accelerator sensed in a period between the following times:

i) a time for the low speed side friction element to start a conveyance of a torque, and ii) a time for ending a transmission to the low speed side change gear, causes an engine torque restriction control for restricting a torque of an engine to a certain engine torque, and adds a duty ratio correction to an engagement command duty ratio of the low speed side friction element, the thus added duty ratio correction being set up corresponding to the certain engine torque.

The other object(s) and feature(s) of the present invention will become understood from the following description with reference to the accompanying drawings.

BRIEF DESCRIPTION OF THE SEVERAL VIEWS OF THE DRAWINGS

FIG. 5 {including FIG. 5(a), FIG. 5(b) and FIG. 5(c)} is a diagram for describing control characteristic of the transmission control system of the automatic transmission 2 for the vehicle, according to the first embodiment.

FIG. 7 {including FIG. 7(a), FIG. 7(b), FIG. 7(c), FIG. 7(d) and FIG. 7(e)} is a diagram for describing control characteristic of the transmission control system of the automatic transmission 2 for the vehicle, according to a second embodiment.

DETAILED DESCRIPTION OF THE EMBODIMENT

In the following, various embodiments of the present invention will be described in detail with reference to the accompanying drawings.

1. First Embodiment

There is provided a transmission control system of an automatic transmission 2 for a vehicle, according to a first embodiment of the present invention.

Figure 1:
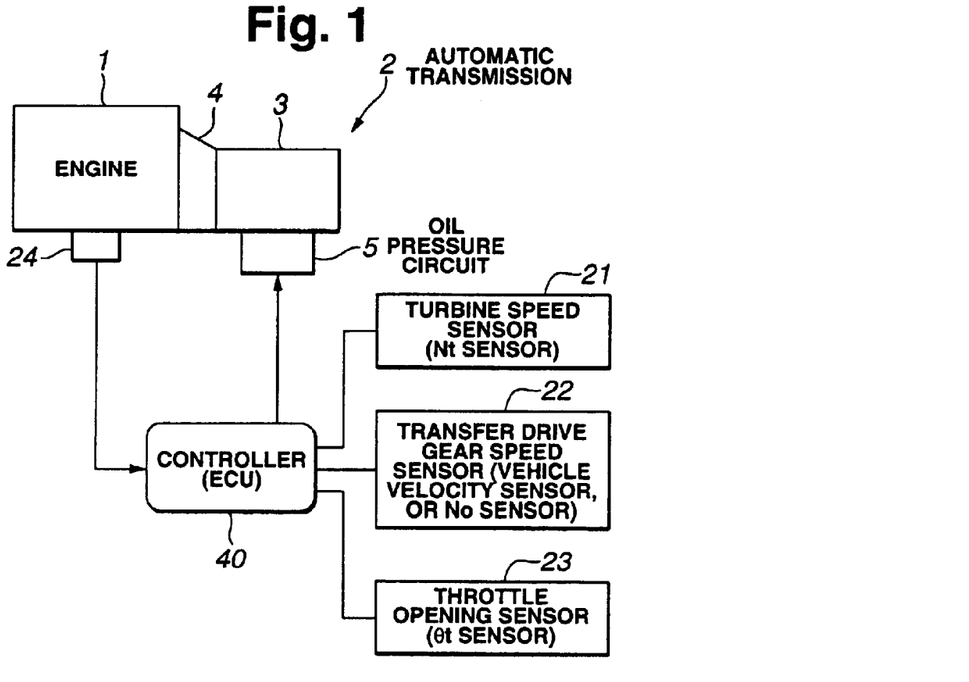
FIG. 1 is an overall view of a transmission control system of an automatic transmission 2 for a vehicle, according to a first embodiment of the present invention.

In FIG. 1, there is provided an engine 1 whose output is conveyed to a drive wheel (not shown) by way of the automatic transmission 2. The automatic transmission 2 includes a torque converter 4, a transmission mechanism 3 (planet gear), an oil pressure circuit 5, a controller 40 (ECU, controlling means) and the like. The transmission mechanism 3 includes a planet gear bringing about four forward speed gears and one backward speed gear. Also included in the transmission mechanism 3 for transmission by changing gear ratio of the planet gear are friction elements such as a multiple of oil clutches and a multiple of oil brakes.

Operation of the transmission mechanism 3 may be controlled based on a control signal from the controller 40. Herein, the controller 40 incorporates a memory {including a ROM (not shown), a RAM (not shown) and the like}, a central processing unit (not shown), an input-output device (not shown), a counter (not shown) as timer, and the like. Connected to the controller 40 include a turbine speed sensor 21 (Nt sensor) for sensing a turbine speed Nt of an input shaft 3a (turbine) of the torque converter 4, a transfer drive gear speed sensor 22 (No sensor) for sensing a transfer drive gear speed No, a throttle opening sensor 23 ($\theta$t sensor) for sensing a throttle opening $\theta$t of a throttle valve disposed on an intake passage of the engine 1, an engine speed sensor 24 (Ne sensor) for sensing an engine speed Ne, an accelerator opening sensor (not shown) for sensing an accelerator opening Acc, and the like. The controller 40 can calculate a vehicle velocity V based on the transfer drive gear speed No, with the transfer drive gear speed sensor 22 as a vehicle velocity sensor.

<Constitution and Operation of Transmission Mechanism 3>

Figure 2:
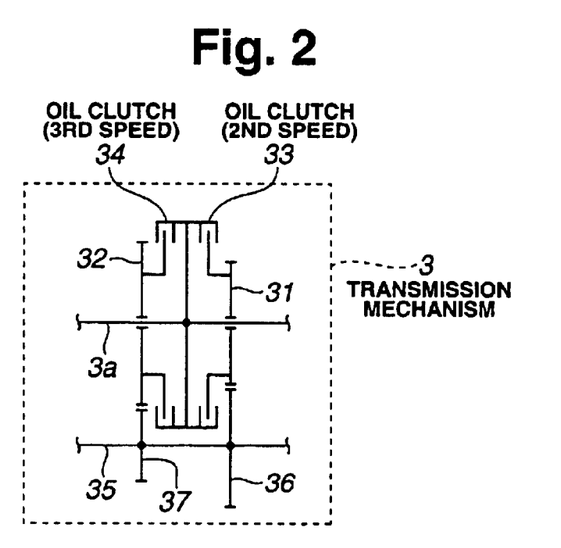
FIG. 2 is a schematic of an inner part of the automatic transmission 2, according to the first embodiment.

Described hereinafter referring to FIG. 2 is operation of the transmission mechanism 3.

For simplification, the transmission mechanism 3 in FIG. 2 has 2-axis parallel gears, instead of the planet gear.

As is seen in FIG. 2, a first driving gear 31 and a second driving gear 32 are rotatably provided around the input shaft 3a of the transmission mechanism 3. The input shaft 3a has a portion that is disposed between the first driving gear 31 and the second driving gear 32 and is fixed to an oil clutch 33 and an oil clutch 34 each as friction element. The first driving gear 31 and the second driving gear 32 respectively engaging with the oil clutch 33 and the oil clutch 34 can rotate substantially integrally with the input shaft 3a.

There is provided an intermediary shaft 35 which is disposed substantially in parallel to the input shaft 3a. The intermediary shaft 35 is connected to the drive wheel (not shown) by way of a final speed reduction gear mechanism (not shown). A first driven gear 36 and a second driven gear 37 are fixed to the intermediary shaft 35, and respectively mesh with the first driving gear 31 and the second driving gear 32.

With the above constitution of the transmission mechanism 3; engaging the oil clutch 33 may convey rotation of the input shaft 3a from the oil clutch 33, by way of the first driving gear 31 and the first driven gear 36, to the intermediary shaft 35, thus achieving for example a 2nd speed, while engaging the oil clutch 34 may convey the rotation of the input shaft 3a from the oil clutch 34, by way of the second driving gear 32 and the second driven gear 37, to the intermediary shaft 35, thus achieving for example a 3rd speed.

Disengaging the engaged oil clutch 33 (low speed side friction element) on the 2nd speed side and engaging the oil clutch 34 (high speed side friction element) on the 3rd speed side may carry out an upshift from the 2nd speed to the 3rd speed. Contrary to this, disengaging the engaged oil clutch 34 (high speed side friction element) and engaging the oil clutch 33 (low speed side friction element) may carry out a downshift from the 3rd speed to the 2nd speed.

<Constitution and Operation of Oil Clutch 33 and Oil Clutch 34>

Figure 3:
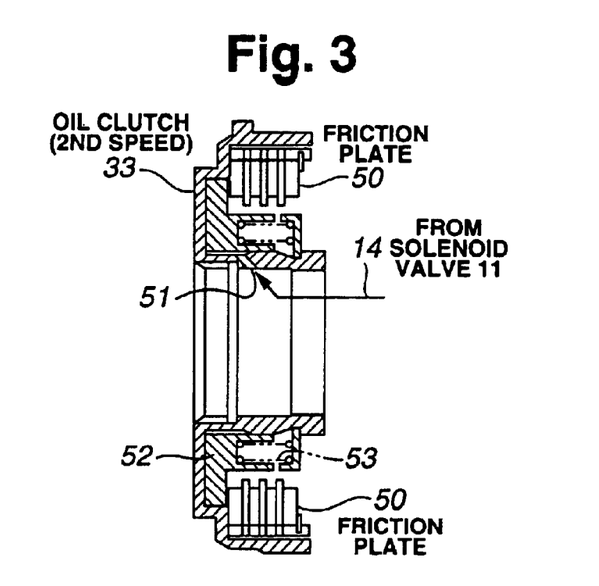
FIG. 3 is a schematic of a constitution of a friction element (33) of the automatic transmission 2, according to the first embodiment.

Hereinafter described referring to FIG. 3 is constitution and operation of the oil clutch 33 and the oil clutch 34.

Herein, the oil clutch 33 and the oil clutch 34 are substantially the same in constitution and operation. The constitution and operation of the oil clutch 34 therefore are to be omitted from the following description.

As is seen in FIG. 3, the oil clutch 33 is of an oil pressure multiple-plate type having a multiple of friction plates 50. The friction plate 50 has an overlapping of a multiple of first plates (rotatable substantially integrally with the input shaft 3a) and a multiple of second plates (rotatable substantially integrally with the first driving gear 31). Hereinabove, the first plate and the second plate are overlapped alternately.

Supplying an operation oil from a second oil passage 14 into the oil clutch 33 by way of a port 51 may move a piston 52 against a biasing force by a return spring 53, thus adhering the friction plates 50 with each other, resulting in engagement state of the oil clutch 33. On the contrary, draining the operation oil from the port 51 to the second oil passage 14 may allow the return spring 53 to press the piston 52 for an opposite movement, thus disengaging the friction plates 50 from each other.

The piston 52 of the oil clutch 33 defines a standby position for carrying out the complete disengagement. In the standby position, there is defined a clearance that is sufficient for preventing what is called a "dragging torque" which may occur between the friction plates 50. For engaging the oil clutch 33, each of the friction plates 50 is to be moved at first to a position for making the clearance substantially 0, in other words, a position on the eve of a position for causing a friction engagement. This movement of the friction plate 50 is defined as a "clearance clogging" which may spend a certain time period (hereinafter referred to as "clearance clogging time").

On the other hand, due to the dragging torque which may be caused in a certain time period after the friction plates 50 starts getting spaced apart from each other, completely disengaging the oil clutch 33 from its engagement state may spend a time after starting drainage of the oil pressure from the oil clutch 33. The above spent time is hereinafter referred to as a "waste time."

<Constitution and Operation of Oil Pressure Circuit 5>

Figure 4:
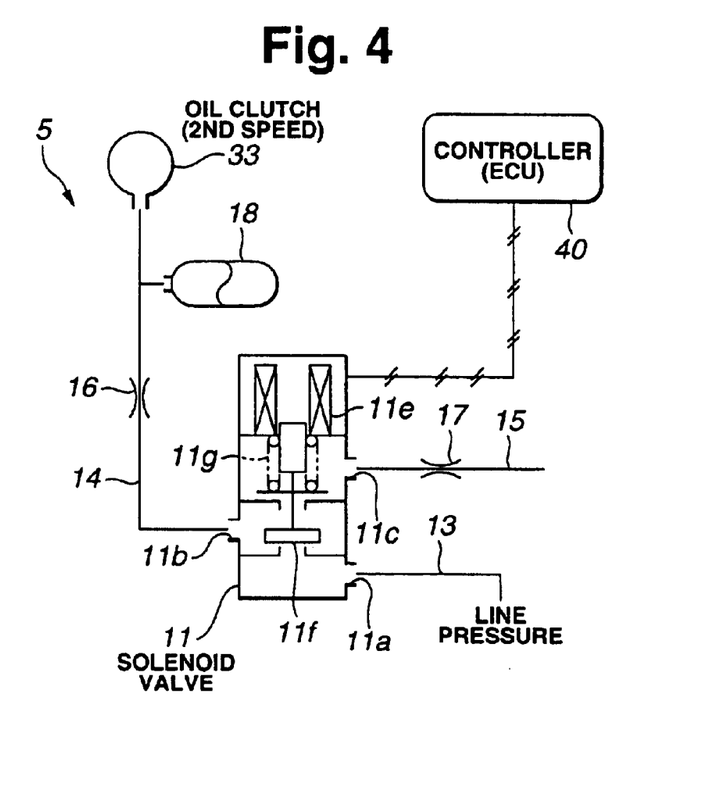
FIG. 4 is a schematic of an oil pressure circuit of the transmission control system of the automatic transmission 2 for the vehicle, according to the first embodiment.

Hereinafter described referring to FIG. 4 is constitution and operation of the oil pressure circuit 5.

The oil pressure circuit 5 has duty ratio solenoid valves (hereinafter referred to as "solenoid valve 11" for simplification) corresponding to the respective friction elements (namely, the clutches and the brakes) as described above. Controlling operation of the solenoid valves 11 can control the operation oil flow (namely, supply and drain of the operation oil to and from the friction elements corresponding to the respective solenoid valves 11). The solenoid valves 11 are substantially common in constitution and operation. Hereinafter described is about the solenoid valve 11 for controlling the oil clutch 33, and therefore repeated explanation about the other solenoid valves is to be omitted.

As is seen in FIG. 4, the solenoid valve 11 is of a normal closed type (ordinarily closed) having a switchover valve for two positions. The solenoid valve 11 has a first port 11a, a second port 11b and a third port 11c in three different portions.

The first port 11a is connected to a first oil passage 13 for supplying the operation oil from an oil pump (not shown). The first oil passage 13 has a pressure regulator (not shown) and the like, supplying the operation oil (line pressure) regulated at a certain pressure.

The second port 11b is connected to the second oil passage 14 extending to the oil clutch 33, while the third port 11c is connected to a third oil passage 15 extending to an oil tank (not shown). The second oil passage 14 has a first orifice 16, while the third oil passage 15 has a second orifice 17. The first orifice 16 of the second oil passage 14 has a flow area larger than that of the second orifice 17 of the third oil passage 15. Moreover, on the second oil passage 14, there is provided an accumulator 18 between the oil clutch 33 and the first orifice 16.

The solenoid valve 11 is electrically connected to the controller 40. The controller 40 can control the duty ratio of the solenoid valve 11 at a certain frequency (for example, 50 Hz). Deenergizing a solenoid 11e of the solenoid valve 11 may allow a return spring 11g to press a valve body 11f, thus cutting the first port 11a from the second port 11b and communicating the second port 11b with the third port 11c. On the other hand, energizing the solenoid 11e of the solenoid valve 11 may allow the valve body 11f to be lifted against a spring force of the return spring 11g, thus communicating the first port 11a with the second port 11b and cutting the second port 11b from the third port 11c.

<Essential Part>

Described hereinafter is an essential part of the transmission control system of the automatic transmission 2 for the vehicle, according to the first embodiment of the present invention.

The transmission control system of the automatic transmission 2 according to the first embodiment has an exemplary feature in a transmission control in the following state:

In a downshift carried out with the accelerator turned off, the driver steps on the accelerator again before the actual transmission start time.

According to the first embodiment, the term "before the actual transmission start time" is defined as a period between the following two times:

1. From a time for commanding a start of transmission of the downshift {in the case of downshift from 3rd speed to 2nd speed: a time for commanding disengagement of the oil clutch 34 which is the high speed side friction element}.

2. To a time for ending the clearance clogging of the oil clutch 33 which is the low speed side friction element. In other words, until the oil clutch 33 starts engagement, or the oil clutch 33 starts conveying the torque.

<Specific Description of Controller 40>

Figure 5A:
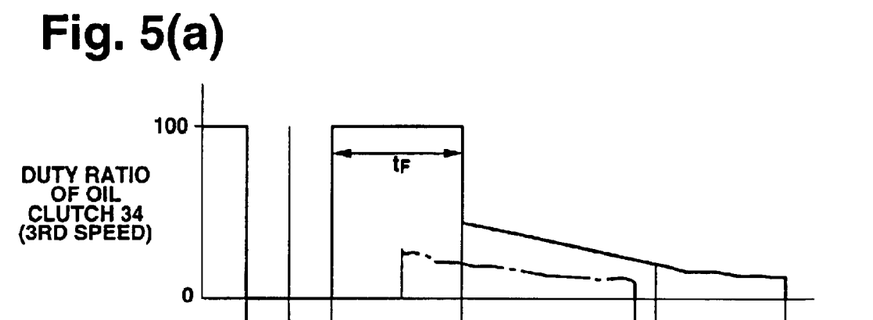
Figure 5B:
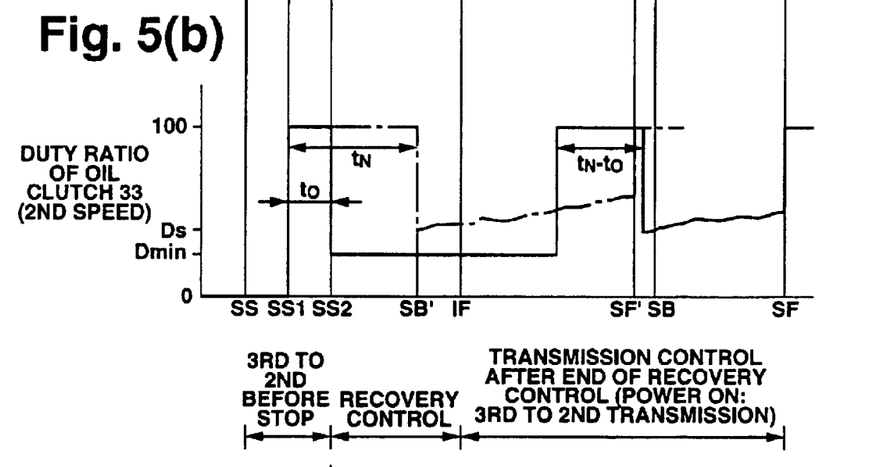
Figure 5C:
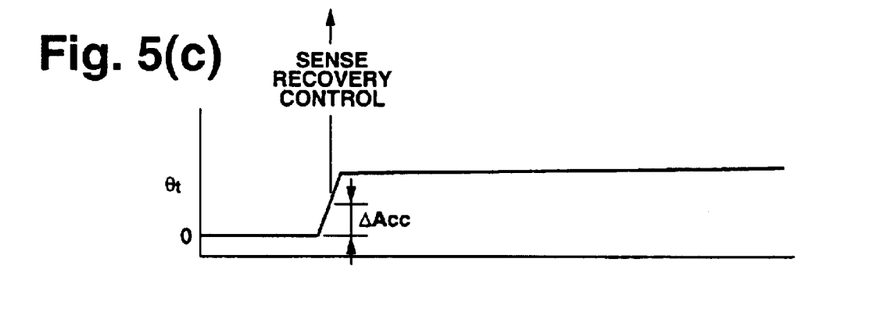

As is seen in FIG. 5(a) to FIG. 5(c), the controller 40 can memorize transmission control characteristic of the automatic transmission 2, namely, control characteristic of the solenoid valve 11. The downshift can be carried out according to the above control characteristic.

Hereinafter described is the downshift with the accelerator turned off (for example, when the driver turns off the accelerator for stopping the vehicle due to red signal).

In this case, based on information from the throttle opening sensor 23 and the transfer drive gear speed sensor 22 (vehicle velocity sensor), the controller 40 may determine whether or not condition for carrying out the downshift is established (whether or not going beyond a downshift line).

With the downshift condition established, the controller 40 may make a switchover from the current speed gear (high speed gear: for example 3rd speed) to another speed gear (low speed gear: for example 2nd speed) which is one speed gear lower than the current speed gear.

More specifically about this: As is seen in FIG. 5(a), the transmission start command (time SS) may make a switchover of the duty ratio of the solenoid valve 11 of the oil clutch 34 (high speed side friction element, 3rd speed, disengagement side) from 100% to 0%, thus starting disengagement of the oil clutch 34.

Then, as is seen in FIG. 5(b), the oil clutch 33 (low speed side friction element, 2nd speed, engagement side) which so far was disengaged may allow the solenoid valve 11 to have the duty ratio 100% (time SS1) provisionally. Hereinabove, making the duty ratio 100% is for the provisional clearance clogging of the oil clutch 33.

There is defined a time lag SS–SS1 between the time SS {oil clutch 34 having the duty ratio 0%} and the time SS1 {oil clutch 33 having the duty ratio 100%}. The time lag SS–SS1 may be caused for the following cause:

Making the oil clutch 34's duty ratio 0% cannot immediately disengage the oil clutch 34 completely, in other words, the waste time for removing the dragging torque is to be spent.

Thereby, the clearance clogging of the oil clutch 33 is to be carried out after an elapse of the waste time.

<Accelerator not Stepped On>See Chain Line in FIG. 5(a) and FIG. 5(b).

With the accelerator not stepped on, thereafter, the controller 40 may make the oil clutch 33's duty ratio 100% in a certain time period, namely, an ordinary clearance clogging time period $t_N$ from the time SS1 to a time SB', as is depicted by a chain line in FIG. 5(b). Then, the oil clutch 33 may have a decrease in duty ratio to obtain an initial engagement duty ratio Ds which may cause a relatively low pressure for allowing the oil clutch 33 to start the torque conveyance. Then, the controller 40 may feedback the duty ratio of the solenoid valve 11 based on change ratio of the turbine speed Nt, thus gradually encouraging the engagement of the oil clutch 33. At a time SF' (sensing a low speed synchronization), the controller 40 may increase the duty ratio of the oil clutch 33 to 100%, thus ending the engagement of the oil clutch 33.

In the above period (from the time SB' to the time SF'), the controller 40 may increase again the duty ratio of the oil clutch 34 (disengagement side), as is depicted by the chain line in FIG. 5(a), to such an extent that the oil clutch 34 can keep an engagement force on the eve of its completed disengagement. From the time SB' on, the controller 40 may gradually disengage the oil clutch 34 by feedbacking the duty ratio based on the change ratio of the turbine speed Nt. Then, at the time SF' (sensing the low speed synchronization), the controller 40 may decrease the duty ratio of the oil clutch 34 to 0%, thus ending the disengagement of the oil clutch 34.

The above sums up the operation for ending the downshift to the 2nd speed.

<Accelerator Stepped On>See Actual Line in FIG. 5(a) and FIG. 5(b).

On the other hand, with the accelerator sensed to be stepped on in the period from the time SS {oil clutch 34 starting disengagement} to the time SB' {ending clearance clogging of oil clutch 33}, the controller 40 may prevent the transmission to the low speed gear (2nd speed) in a certain time period, instead, may carry out the transmission control to the high speed gear (3rd speed) before the transmission start. The above transmission is hereinafter referred to as "recovery control" or "gear change prevention control."

Hereinabove, the stepping on the accelerator can be, as is seen in FIG. 5(c), determined based on an accelerator opening correction ΔAcc (deg./s). More specifically, the accelerator opening correction ΔAcc (deg./s) at or over a certain point may be a criteria for determining that the accelerator is stepped on.

Stepping on the accelerator in the downshift with the accelerator turned off may occur in the following case and the like:

Before stopping the vehicle for the red signal, a sudden change of the signal into green makes the driver to step on the accelerator.

Described below is concerning the above recovery control. At a time SS2 (sensing the stepped accelerator), the duty ratio of the oil clutch 33 is decreased to a minimum duty ratio Dmin. Substantially simultaneously with this, the duty ratio of the oil clutch 34 may be increased to 100%, keeping the 3rd speed. The minimum duty ratio Dmin can be set up as follows:

A duty ratio causing (corresponding to) an oil pressure for allowing the piston 52 of the oil clutch 33 to keep a stroke position (defined from the time SS1 to the time SS2) against the biasing force of the return spring 53.

In other words, the minimum duty ratio Dmin can keep the oil clutch 33 (low speed side) in a state at the time SS2 when the accelerator is sensed to be stepped on.

Hereinafter described is a more specific method for setting up the minimum duty ratio Dmin.

Method 1: Referring to a time period t0 from, for example, the time SS1 (starting the clearance clogging) to the time SS2 (sensing the stepped accelerator), the controller 40 may calculate the operation oil's flow rate used for the piston 52 to make the stroke. The thus calculated operation oil's flow rate is to be converted into the oil pressure for keeping the position of the above piston 52's stroke position at the time SS2 (sensing the stepped accelerator). Then, the minimum duty ratio Dmin is set up corresponding to the thus converted oil pressure.

Method 2: The minimum duty ratio Dmin can be predetermined otherwise. Irrespective of the time period t0 {namely, a time ending at the time SS2 (sensing the stepped accelerator)} relative to the ordinary clearance clogging time period $t_N$, the controller 40 can predetermine one duty ratio corresponding to an oil pressure for an incomplete stroke (a stroke to a certain extent) of the piston 52. The above one duty ratio can be defined as the minimum duty ratio Dmin. In this case, however, the oil pressure is preferred to be closer to a completed stroke of the piston 52.

Thereafter, the oil clutch 34 may keep the duty ratio 100% in a certain time period $t_F$, thereby preventing the downshift in the certain time period $t_F$, as is seen in FIG. 5(a). At least in the certain time period $t_F$, the oil clutch 34 (high speed side) can assuredly keep its engagement. In other words, described as below:

Changing the duty ratio of the oil clutch 34 to 100% cannot immediately engage the oil clutch 34. Therefore, the certain time period $t_F$ is to be spent as a standby time for assuredly engaging the oil clutch 34.

Even the accelerator is stepped on in a state that the oil clutch 34's engagement force decrease is started and that the oil clutch 33 is still disengaged, carrying out the above recovery control can prevent the transmission shock by engaging the oil clutch 34 immediately (namely, by recovering the speed gear to the high speed side [3rd speed]). In the certain time period $t_F$, the controller 40 can keep the 3rd speed in gear, thereby preventing a rapid engine speed increase which may be caused with the accelerator stepped on. With this, the vehicle can be kept accelerated.

After an elapse of the certain time period $t_F$, the controller 40 may carry out an ordinary control based on the accelerator opening and the vehicle velocity. In other words, the controller 40 may determine, referring to a transmission map, whether to keep the current high speed or change to the low speed.

When the downshift with the accelerator stepped on (in other words, power on downshift) is sensed to occur, the actual line in FIG. 5(a) shows that the oil clutch 34's duty ratio is reduced from 100% to a certain duty ratio immediately, as is indicated by a transmission start time IF in FIG. 5(a). Then, the duty ratio is further reduced continuously (or at a certain rate) up to a time SB for allowing the oil clutch 34 to start slipping. With the slipping of the oil clutch 34 sensed referring to change in the turbine speed Nt, the duty ratio of the oil clutch 34 may, thereafter, be fedback based on the change rate of the turbine speed Nt for the gradual disengagement of the oil clutch 34. Then, at a time SF (sensing the low speed synchronization), the controller 40 may decrease the duty ratio of the oil clutch 34 to 0%, thus ending the disengagement of the oil clutch 34.

In the above period, the controller 40 may disengage the oil clutch 33. More specifically, the controller 40 may at first change the duty ratio of the oil clutch 33 to 100% for the clearance clogging. The clearance clogging is so started as to be ended on the eve of the time SB. Hereinabove, the provisional clearance clogging of the oil clutch 33 has already been carried out from the time SS1 to the time SS2 (time period t0), followed by the minimum duty ratio Dmin. With this, the clearance clogging time can be shortened by subtracting the time period t0 from the ordinary clearance clogging time period $t_N$, as is depicted by the actual line in FIG. 5(b).

After the end of the clearance clogging (elapse of the clearance clogging time), the controller 40 may decrease the oil clutch 34's duty ratio to an initial engagement duty ratio which corresponds to a then input torque and is approximated to the initial engagement duty ratio Ds. From the time SB (sensing the slip of the oil clutch 34), based on the change in the turbine speed Nt, the controller 40 may so make the feedback as to gradually encourage the engagement of the oil clutch 33. At the time SF (sensing the low speed synchronization), the controller 40 may increase the duty ratio of the oil clutch 33 to 100%, thus ending the engagement of the oil clutch 33. With this, the repeated downshift can be ended.

In the following state after the elapse of the certain time period $t_F$ (namely, at the transmission start time IF), the controller 40 is to make a power off downshift depicted by the chain line instead of the actual line in FIG. 5:

The accelerator is already opened again with opening angle 0, and the downshift condition is established.

<Flow Chart—First Embodiment>

Figure 6:
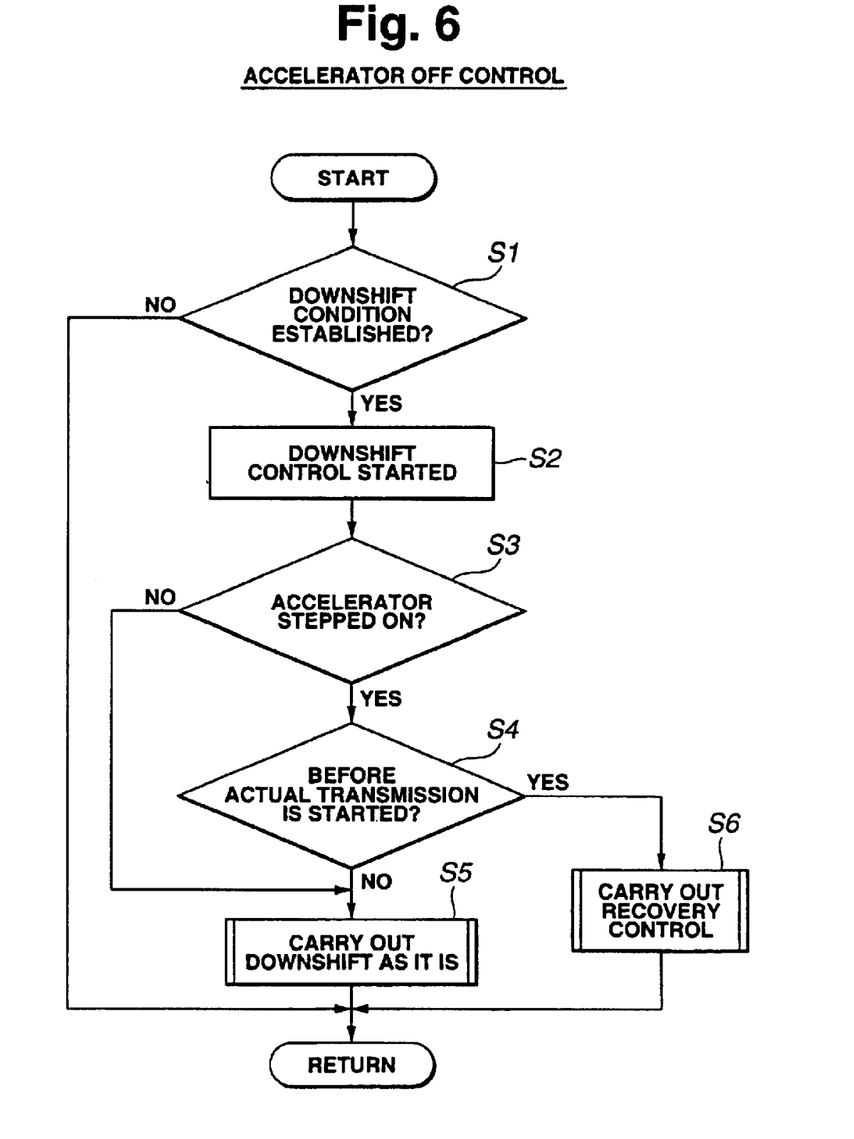
FIG. 6 is a flow chart for describing operation of the transmission control system of the automatic transmission 2 for the vehicle, according to the first embodiment.

With the constitution and the operation described above, the essential part of the transmission control system of the automatic transmission 2 for the vehicle according to the first embodiment of the present invention can carry out the transmission control, for example, along the following flow chart, as is seen in FIG. 6.

<Step 1>

A routine determines whether or not the downshift condition is established with the accelerator turned off (coasting).

If YES at step 1, the routine moves to the subsequent step 2.

If NO at step 1, the routine makes a return.

<Step 2>

The routine starts the downshift control.

<Step 3>

The routine determines whether or not the accelerator is stepped on.

If YES at step 3, the routine moves to the subsequent step 4.

If NO at step 3, the routine moves to step 5.

<Step 4>

The routine determines whether or not the accelerator is stepped on before the actual transmission start time SB'. In other words, the routine determines whether or not the accelerator is stepped on in the period from the time SS {oil clutch 34 starting disengagement} to the time SB' {ending clearance clogging of oil clutch 33}.

If NO at step 4, the routine moves to the subsequent step 5.

If YES at step 4, the routine moves to the subsequent step 6.

<Step 5>

The routine carries out the downshift. The entire contents of U.S. Pat. No. 5,445,579 (equivalent of Japanese Patent No. 3097339B2) is incorporated herein for reference, disclosing the above downshift.

<Step 6>

The routine carries out the recovery control (or gear change prevention control). In this case, the routine engages again the oil clutch 34 on the high speed side (3rd speed), thereby keeping in the certain period $t_F$ the 3rd speed before the downshift.

Described hereinafter is more details (effect) about the step 6.

Even the accelerator is stepped on in the state that the oil clutch 34's engagement force decrease is started and that the oil clutch 33 is still disengaged, carrying out the above recovery control can prevent the transmission shock by engaging the oil clutch 34 immediately (namely, by recovering the speed gear to the high speed side [3rd speed]). In the certain time period $t_F$, the controller 40 can keep the 3rd speed in gear, thereby preventing the rapid engine speed increase which may be caused with the accelerator stepped on. With this, the vehicle can be kept accelerated with improved drivability.

Moreover, in this case, the oil clutch 33 (low speed side) is so kept as to have the minimum duty ratio Dmin, in other words, the oil clutch 33 can be kept in the piston 52's stroke position. With this, the oil clutch 33 can make a preferable response to a subsequent downshift, resulting in decrease in transmission time.

Keeping the downshift condition after the recovery control (gear change prevention control) can carry out the downshift again, eliminating an acceleration force shortage (failure) which may be caused with the high speed side kept.

More specifically about this: According to the first embodiment of the present invention, the piston 52 of the oil clutch 33 (low speed side) is kept in the stroke position at the time SS2 (sensing the stepped accelerator) and the clearance clogging time in the subsequent downshift can be shortened by subtracting the time period t0 from the ordinary clearance clogging time period $t_N$ (since the provisional clearance clogging of the oil clutch 33 has already been carried out from the time SS1 to the time SS2, namely, the time period t0). In the subsequent downshift, thereby, the routine can control the oil pressure of the oil clutch 33 (low speed side) with high accuracy and precision, thus restricting the transmission shock.

2. Second Embodiment

There is provided a transmission control system of the automatic transmission 2 for the vehicle, according to a second embodiment of the present invention.

According to the first embodiment, the transmission control is carried out by the driver who steps on the accelerator again "before" the actual transmission start time in the downshift with the accelerator turned off.

Contrary to the first embodiment, the transmission control according to the second embodiment is carried out by the driver who steps on the accelerator again "after" the actual transmission start time in the downshift with the accelerator turned off.

Other than the operation described above, the transmission control system according to the second embodiment is substantially the same as the transmission control system according to the first embodiment. Therefore, parts and sections substantially the same are denoted by the same numerals, and repeated descriptions are omitted.

Hereinafter, the description according to the second embodiment is made referring to FIG. 7(a), FIG. 7(b), FIG. 7(c), FIG. 7(d) and FIG. 7(e). Based on the information from the throttle opening sensor 23 and the transfer drive gear speed sensor 22 (vehicle velocity sensor), the controller 40 may determine whether or not the condition for carrying out the downshift is established (whether or not going beyond the downshift line).

With the downshift condition established, the controller 40 may make the switchover from the current speed gear (high speed gear: for example 3rd speed) to another speed gear (low speed gear: for example 2nd speed) which is one speed gear lower than the current speed gear.

More specifically about this: As is seen in FIG. 7(*b*), the transmission start command (at the time SS) may make the switchover of the duty ratio of the solenoid valve 11 of the oil clutch 34 (high speed side friction element, 3rd speed, disengagement side) from 100% to 0%, thus starting disengagement of the oil clutch 34.

With this, as is seen in FIG. 7(*a*), the oil clutch 34 may decrease its oil pressure. Thereafter, the waste time is elapsed for removing the dragging torque of the oil clutch 34. Then, as is seen in FIG. 7(*c*), the oil clutch 33 (low speed side friction element, 2nd speed, engagement side) which so far was disengaged may allow its solenoid valve 11 to have the duty ratio 100% {at the time SS1 in FIG. 7(*c*)}. The current state is to be kept in the ordinary clearance clogging time period $t_N$ for clogging the clearance of the oil clutch 33.

With this, as is seen in FIG. 7(*a*), the oil clutch 33 may cause a relatively low oil pressure (uprising), thus allowing the piston 52 of the oil clutch 33 to make a stroke to such an extent as to convey the torque.

According to the second embodiment, like the first embodiment, the time SB' is defined as the time for ending the clearance clogging of the oil clutch 33 {otherwise, a time for starting engagement of the oil clutch 33, or starting torque conveyance by the oil clutch 33}. Therefore, this time SB' is otherwise referred to as the actual transmission start time SB'.

Then, as is seen in FIG. 7(*c*), the duty ratio of the solenoid valve 11 of the oil clutch 33 is decreased to the initial engagement duty ratio Ds which may cause a relatively low pressure, namely, as low as at least to keep the above clearance clogging. The initial engagement duty ratio Ds may be kept until the transmission start (from 3rd speed to 2nd speed) is sensed at the transmission start time IF in FIG. 7(*e*). Then, once the transmission start is sensed at the transmission start time IF in FIG. 7(*e*), the routine may feedback the duty ratio of the solenoid valve 11 based on the change in the turbine speed Nt, thus gradually encouraging the engagement of the oil clutch 33.

Moreover, once the transmission start is sensed at the transmission start time IF, the oil clutch 34 may also increase the duty ratio again, as is seen in FIG. 7(*b*), to such an extent as to keep the engagement force. This duty ratio of the oil clutch 34 may be kept from the transmission start time IF in a certain time period. Thereafter, the duty ratio of the oil clutch 34 may be fedback based on the change in the turbine speed Nt, thus gradually encouraging the disengagement of the oil clutch 34.

<How to Determine Transmission Start (from 3rd Speed to 2nd Speed)>

Hereinafter described is briefing of how to determine the transmission start from 3rd speed to 2nd speed. The controller 40 can determine the transmission start based on the turbine speed Nt (sensed by means of the turbine speed sensor 21) and the transfer drive gear speed No (sensed by means of the transfer drive gear speed sensor 22).

More specifically about this: The transmission at the 3rd speed (in gear) may cause Nt=r·No (r: 3rd speed gear ratio), while Nt≠r·No may be caused by the transmission start. With Nt−r·No>a certain speed (for example, 30 rpm), the controller 40 may determine that the transmission from 3rd speed to 2nd speed is started. As a matter of course, the transmission start time IF is caused after the actual transmission start time SB'.

Figure 7A:
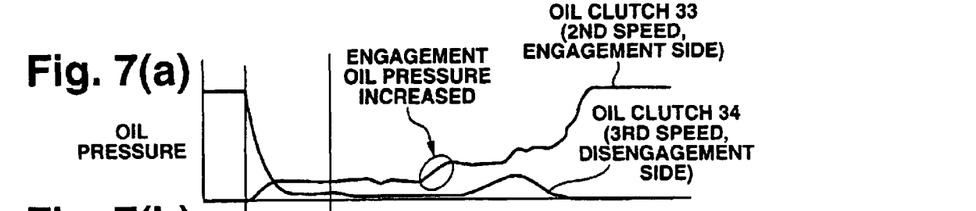
Figure 7B:
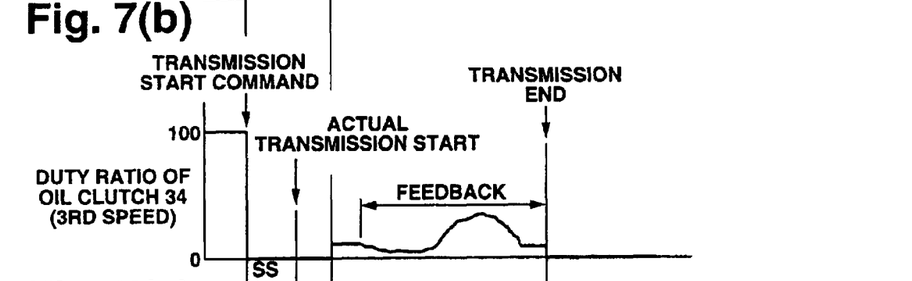

According to the second embodiment, determining or sensing the stepped accelerator (namely, accelerator turned on) in a period from the oil clutch 33's torque conveyance start (namely, after the oil clutch 33's clearance clogging is ended at the time SB') to a transmission end time t2, the controller 40 may carry out an engine torque restriction control for restricting the engine torque to a certain engine torque Tr1. The above stepped accelerator can be determined by a method that is substantially the same as the method according to the first embodiment referring to FIG. 5(*c*). More specifically, with the accelerator opening correction ΔAcc (deg./s) in FIG. 7(*d*) at or over a certain point, the controller 40 may determine that the accelerator is stepped on.

<Engine Torque Restriction Control>

Hereinafter described is the engine torque restriction control. After the time SB', with the stepped accelerator sensed at a time t1 (sensing the stepped accelerator) in FIG. 7(*d*), the controller 40 may make the engine torque restriction control. More specifically, the engine torque may be restricted to the certain engine torque Tr1 which is predetermined irrespective of the extent of the stepped accelerator.

Described below is why the engine torque is restricted in case of the stepped accelerator again in the downshift from the actual transmission start time SB' to the transmission end time t2:

Due to the oil clutch 33 and the oil clutch 34 each of which is not engaged in the above period, the engine torque outputted according to the stepped accelerator may rapidly increase the engine speed to or over the low speed synchronization, resulting in loss in acceleration feel. In addition, a subsequent feedback of the oil clutch 34 may rapidly increase an engagement oil pressure, thus causing the great transmission shock.

According to the second embodiment, the restriction to the certain engine torque Tr1 in case of the stepped accelerator again in the downshift from the actual transmission start time SB' to the transmission end time t2, therefore, may prevent the rapid engine speed increase to or over the low speed synchronization. Increasing up to the certain engine torque Tr1 is for preventing discomfort of the driver that the vehicle is not accelerated, even with the rapid engine speed increase prevented. With the rapid engine speed increase to or over the speed synchronization thus prevented, an excessive feedback (which may be made afterward) can be restricted, thus preventing the transmission shock.

According to the second embodiment, the transmission control system is so constituted that the engine torque restriction control is carried out by restricting the throttle opening θt. More specifically, used for the transmission control system according to the second embodiment is an accelerator pedal (not shown) and a throttle valve (not shown) electrically connected, namely, what is called a throttle-by-wire system or an electronic control throttle valve (ETV). With the above transmission control system, the control signal from the controller 40 can vary the throttle opening θt properly.

In an ordinary travel of the vehicle, the throttle valve (not shown) can be controlled with the throttle opening θt corresponding to the accelerator opening Acc. Moreover in this case, the stepped accelerator sensed again in the downshift after the oil clutch 33's clearance clogging is ended at the time SB' may restrict the throttle opening θt to a certain opening. A broken line in FIG. 7(*d*) shows characteristic of the accelerator opening Acc (virtual) corresponding to the throttle opening θt (certain opening).

Carrying out the above throttle control may restrict an engine intake and therefore restrict the engine torque. Hereinabove, the throttle opening θt (certain opening) is to be predetermined according to the certain engine torque Tr1. Otherwise, the throttle opening θt certain (opening) can be determined as the throttle opening θt at the time t1 (sensing the stepped accelerator).

On the other hand, the oil clutch 33 and the oil clutch 34 feedback the duty ratio of the respective solenoid valves 11 based on the change in the turbine speed Nt. With the stepped accelerator sensed again at the time t1 (sensing the stepped accelerator), the oil pressure is to be increased immediately according to the stepped accelerator. The above feedback, however, may delay the oil pressure response, resulting in failure of immediate increase in the oil pressure.

Especially, the oil clutch 34 may be unable to increase immediately the oil pressure for the following cause:

Until the accelerator is stepped on again, the accelerator is turned off (coasting). Therefore, when the stepped accelerator is sensed, the piston 52 is in a state before ending the stroke.

Figure 7C:
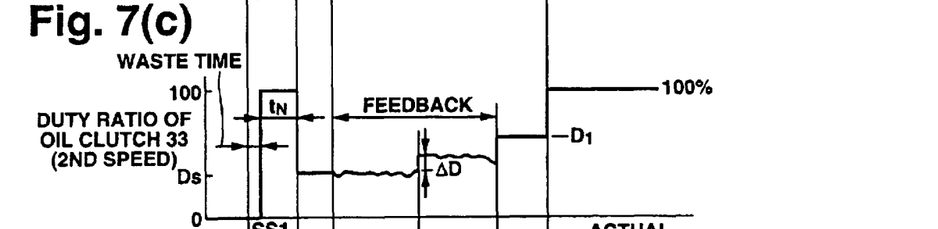
Figure 7D:
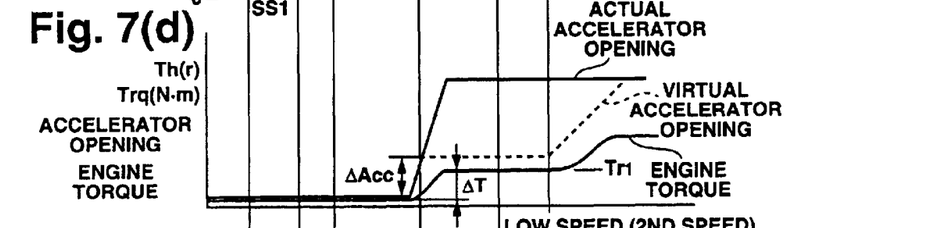
Figure 7E:
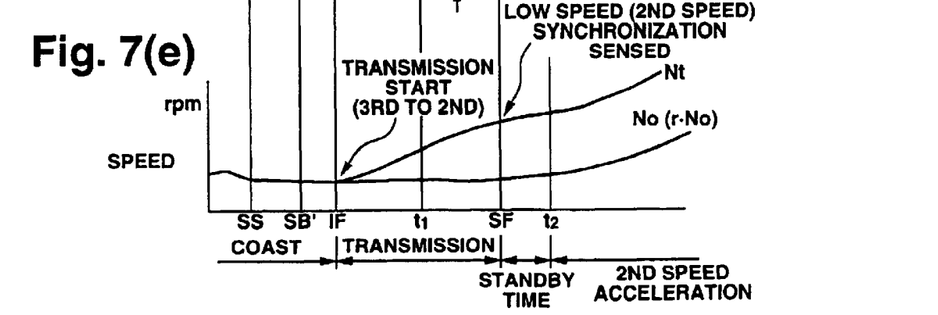

In view of the above delay in the oil pressure response, the controller 40 once sensing the stepped accelerator can increase the duty ratio of the oil clutch 33 by a duty ratio correction ΔD at the time t1 (sensing the stepped accelerator) at which time the piston 52 ends the stroke causing a good response, as is seen in FIG. 7(c). Hereinabove the duty ratio at the time t1 is defined as an engagement command duty ratio.

Increasing by the duty ratio correction ΔD at the time t1 (sensing the stepped accelerator) may increase the engagement oil pressure of the oil clutch 33, as is seen in FIG. 7(a), thus encouraging the engagement of the oil clutch 33.

Instead of restricting the engine torque increase completely at the time the accelerator is stepped on again, the controller 40 according to the second embodiment may, as is seen in FIG. 7(d), increase the engine torque from its substantially idling point to the certain engine torque Tr1. In this case, the engagement oil pressure of the oil clutch 33 and the oil clutch 34 can be fedback, and therefore, the duty ratio may be controlled according to the turbine speed Nt's increase according to the engine torque increase. In this case, however, the delay in the oil pressure itself may cause the rapid engine speed increase to or over the speed synchronization. With the thus caused rapid engine speed increase to or over the speed synchronization, the controller 40 may determine that the oil clutch 34 is short of the oil pressure, thereby supplying the engagement oil pressure to the oil clutch 34 more than necessary (in other words, the duty ratio may be set higher than necessary), thus rapidly engaging the oil clutch 34 and leading to the transmission shock.

For preventing the above transmission shock, at the time t1 (sensing the stepped accelerator), the controller 40 may in advance increase the duty ratio (engagement command duty ratio) of the oil clutch 33 (which has ended the piston 52's stroke and therefore can cause the good response) by the duty ratio correction ΔD for correcting the engagement oil pressure to the increase side, thus restricting the engine speed below the speed synchronization.

The above duty ratio correction ΔD can be set up according to an engine torque correction ΔT, as is seen in FIG. 7(d). The engine torque before the accelerator is stepped on is substantially equivalent to the engine torque at the idling, while the engine torque after the accelerator is stepped on is set at the certain engine torque Tr1 irrespective of the accelerator opening. Thereby, the engine torque correction ΔT may be regarded as a certain torque (constant). With this, the duty ratio correction ΔD which may be set up according to the engine torque correction ΔT can be predetermined, thereby simplifying control logic.

With the low speed synchronization (2nd speed) determined at the time SF based on the turbine speed Nt and transfer drive gear speed No (output shaft speed), thereafter, the controller 40 may set up the duty ratio of the oil clutch 33 at a certain duty ratio D1, and keep the thus set up certain duty ratio D1 in a certain standby period. The controller 40, on the other hand, may continue the feedback of the oil clutch 34.

Hereinabove, the above standby period is to be defined for assuring the downshift to the 2nd speed. In the standby period, the engine torque restriction control can be continued.

After an elapse of the standby period (transmission end time t2) the controller 40, as is seen in FIG. 7(b) and FIG. 7(c), may respectively set the duty ratio of the oil clutch 34 at 0% and the duty ratio of the oil clutch 33 at 100%, thus ending a series of the downshift (transmission end).

Moreover, as is seen in FIG. 7(d), substantially simultaneously with the above transmission end at the transmission end time t2, the controller 40 may end the engine torque restriction control. In this case, the throttle opening θt so increased with a certain slope as to match with a throttle opening θt corresponding to an actual accelerator opening may recover the engine torque, thus shifting to the acceleration at the 2nd speed.

<Flow Chart—Second Embodiment>

Figure 8:
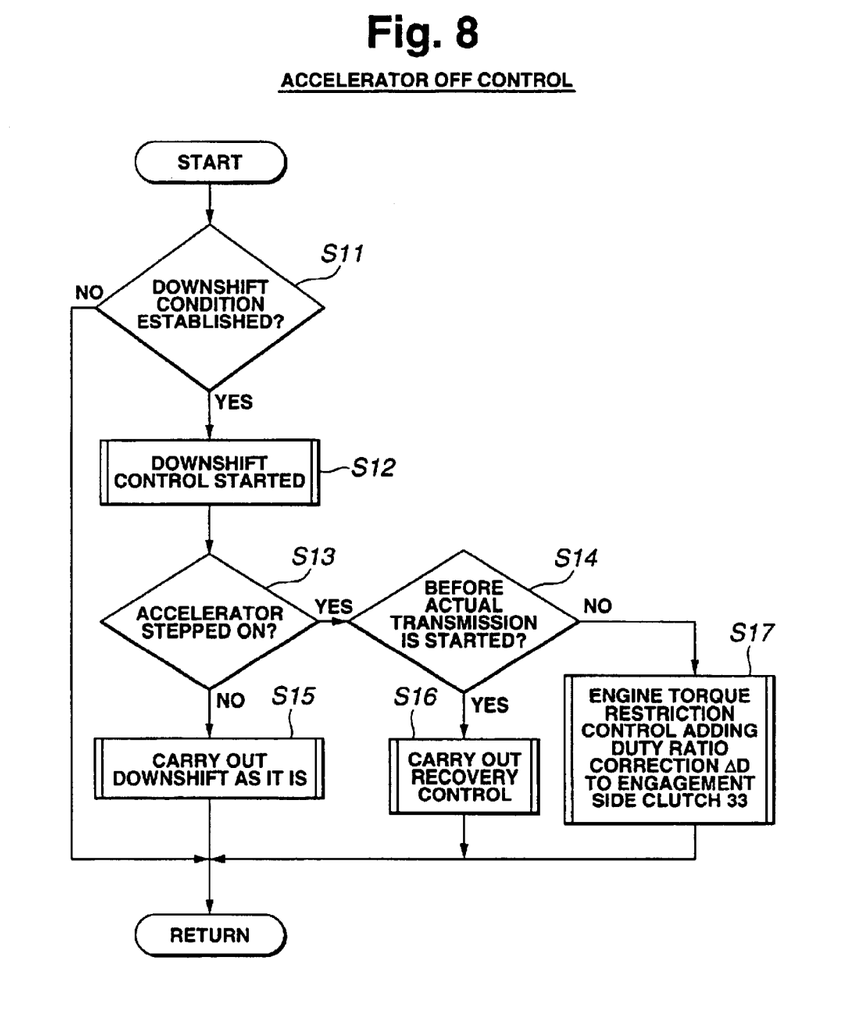
FIG. 8 is a flow chart for describing operation of the transmission control system of the automatic transmission 2 for the vehicle, according to the second embodiment.

With the constitution and the operation as described above, the essential part of the transmission control system of the automatic transmission 2 for the vehicle according to the second embodiment of the present invention can carry out the transmission control, for example, along the following flow chart, as is seen in FIG. 8.

<Step 11>

The routine determines whether or not the downshift condition is established with the accelerator turned off (coasting).

If YES at step 11, the routine moves to the subsequent step 12.

If NO at step 11, the routine makes the return.

<Step 12>

The routine starts the downshift control.

<Step 13>

The routine determines whether or not the accelerator is stepped on.

If YES at step 13, the routine moves to the subsequent step 14.

If NO at step 11, the routine moves to the subsequent step 15.

<Step 14>

The routine determines whether or not the accelerator is stepped on before the actual transmission start time SB'. The above determination can be carried out by determining whether or not the clearance clogging of the oil clutch 33 (2nd speed) is ended.

If YES at step 14 (accelerator stepped before the actual transmission start time SB'), the routine moves to the subsequent step 16.

If NO at step 14 (accelerator stepped after the actual transmission start time SB'), the routine moves to the subsequent step 17.

<Step 15>

The routine carries out an ordinary shiftdown, followed by the return.

<Step 16>

The routine carries out the recovery control as described in the <Step 6> of the flow chart according to the first embodiment.

<Step 17>

The routine caries out the engine torque restriction control. Namely, with the accelerator opening correction ΔAcc (deg./s) at or over the certain point at the time t1 (sensing the stepped accelerator), the throttle may be fixed to the throttle opening θt (certain opening), thus restricting the engine torque to the certain engine torque Tr1. Then, after the elapse of the standby period, the routine may determine that the transmission to the low speed is ended, thus ending the engine torque restriction control.

The thus restricted engine torque can restrict the rapid engine speed increase to or over the speed synchronization. Moreover in this case, instead of restricting the engine torque completely, a certain amount of allowance is provided for the engine torque, thus preventing discomfort of the driver that the vehicle is not accelerated. With the engine speed increase restricted as described above, rapid engagement of the oil clutch 34 which may be caused by the subsequent feedback can be prevented, thus preventing the transmission shock.

When the stepped accelerator is sensed (time t1), increasing the duty ratio of the oil clutch 33 which has ended the piston 52's stroke can minimize delay in the oil pressure response. With the engine speed increased toward the speed synchronization, the oil clutch 33 is increased by the duty ratio correction ΔD, thus restricting the engine speed below the speed synchronization.

The duty ratio correction ΔD which may be set up according to the engine torque (engine torque correction ΔT) in the engine torque restriction control can be predetermined with ease, thereby simplifying the control logic.

With the low speed synchronization sensed (time SF), the controller 40 may set the oil clutch 33 at the certain duty ratio D1 and keep the certain duty ratio D1 for a certain standby time, thus assuredly carrying out the transmission to the 2nd speed.

After the elapse of the standby time, the controller 40 may determine that the transmission to the lower speed is ended, thus ending the engine torque restriction control. After the transmission end (transmission end time t2), therefore, the engine torque can be outputted according to acceleration operation by the driver, thus preventing the driver from feeling discomfort and preventing drivability loss. After the engine torque restriction control is ended, hereinabove, the throttle opening θt may be so increased with the certain slope as to match with the throttle opening θt corresponding to the actual accelerator opening. With this, the engine torque can be recovered linearly according to the actual accelerator opening, thus preventing the drive from feeling discomfort.

Although the present invention has been described above by reference to two embodiments, the present invention is not limited to the two embodiments described above. Modifications and variations of the two embodiments described above will occur to those skilled in the art, in light of the above teachings.

More specifically, according to the first embodiment and the second embodiment, the downshift is from the 3rd speed to the 2nd speed. The present invention is, however, not limited to this. Another downshift is allowed provided that one of the friction elements is changed from engagement to disengagement while the other of the friction elements is changed from disengagement to engagement.

Moreover, the engine torque restriction control according to the second embodiment is simplified by the throttle opening θt's restriction. The method of restricting the engine torque is, however, not limited to the above. Restricting the engine torque by decreasing fuel injection or varying ignition timing is allowed.

This application is based on a prior Japanese Patent Application No. P2002-292769 (filed on Oct. 4, 2002 in Japan) and a prior Japanese Patent Application No. P2003-317054 (filed on Sep. 9, 2003 in Japan). The entire contents of the Japanese Patent Application No. P2002-292769 and the Japanese Patent Application No. P2003-317054 from both of which priority is claimed is incorporated herein by reference, in order to take some protection against mistranslation or omitted portions.

The scope of the present invention is defined with reference to the following claims.

What is claimed is:

1. A transmission control system, comprising:
 1) a high speed side friction element for establishing a high speed side change gear; and
 2) a low speed side friction element for establishing a low speed side change gear, after a disengagement of the high speed side friction element, the low speed side friction element makes an engagement for carrying out a downshift from the high speed side change gear to the low speed side change gear,
 wherein
 when the downshift is carried out with an accelerator turned off,
  a stepping on the accelerator sensed in a period between the following times:
   i) a time for commanding a start of a transmission, and
   ii) a time for the low speed side friction element to start a conveyance of a torque,
  prevents a changeover to the low speed side change gear, thus keeping the high speed side change gear.

2. The transmission control system as claimed in claim 1, wherein
 when the changeover to the low speed side change gear is prevented,
  the high speed side friction element is made back to a state for an engagement, and
  the low speed side friction element is kept in a state bought about when the stepping on the accelerator is sensed.

3. The transmission control system as claimed in claim 1, wherein
 with the downshift condition kept after the prevention of the changeover to the low speed side change gear, the downshift is carried out again.

4. The transmission control system as claimed in claim 1, wherein
 when the downshift is carried out with the accelerator turned off,
  the stepping on the accelerator sensed in a period between the following times:
   i) the time for the low speed side friction element to start the conveyance of the torque, and
   ii) a time for ending the transmission to the low speed side change gear,
  causes an engine torque restriction control for restricting a torque of an engine to a certain engine torque, and adds a duty ratio correction to an engagement command duty ratio of the low speed side friction element, the thus added duty ratio correction being set up according to the certain engine torque.

5. The transmission control system as claimed in claim 4, wherein when an end of the transmission to the low speed side change gear is sensed, the engine torque restriction control is ended.

6. The transmission control system as claimed in claim 4, wherein the torque of the engine is restricted by controlling a throttle opening of a throttle which is mounted to the engine.

7. The transmission control system as claimed in claim 1, wherein the transmission control system is included in an automatic transmission for a vehicle.

8. A transmission control system, comprising:

1) a high speed side friction element for establishing a high speed side change gear; and
2) a low speed side friction element for establishing a low speed side change gear, after a disengagement of the high speed side friction element the low speed side friction element makes an engagement for carrying out a downshift from the high speed side change gear to the low speed side change gear, wherein when the downshift is carried out with an accelerator turned off,
 a stepping on the accelerator sensed in a period between the following times:
 i) a time for the low speed side friction element to start a conveyance of a torque, and
 ii) a time for ending a transmission to the low speed side change gear,
 causes an engine torque restriction control for restricting a torque of an engine to a certain engine torque, and
 adds a duty ratio correction to an engagement command duty ratio of the low speed side friction element, the thus added duty ratio correction being set up corresponding to the certain engine torque.

9. The transmission control system as claimed in claim 8, wherein when an end of the transmission to the low speed side change gear is sensed, the engine torque restriction control is ended.

10. The transmission control system as claimed in claim 8, wherein the torque of the engine is restricted by controlling a throttle opening of a throttle which is mounted to the engine.

11. The transmission control system as claimed in claim 8, wherein the transmission control system is included in an automatic transmission for a vehicle.

12. The transmission control system as claimed in claim 8, wherein the torque of the engine is restricted by varying a fuel injection.

13. The transmission control system as claimed in claim 8, wherein the torque of the engine is restricted by varying an ignition timing.

14. A transmission control system of an automatic transmission for a vehicle, comprising:

1) a first means for establishing a high speed side change gear (3rd speed); and
2) a second means for establishing a low speed side change gear, after a disengagement of the first means, the second means makes an engagement for carrying out a downshift from the high speed side change gear to the low speed side change gear, wherein when the downshift is carried out with an accelerator turned off,
 a stepping on the accelerator sensed in a period between the following times:
 i) a time for commanding a start of a transmission, and
 ii) a time for the second means to start a conveyance of a torque,
 prevents a changeover to the low speed side change gear, thus keeping the high speed side change gear.

* * * * *